Figure 6:
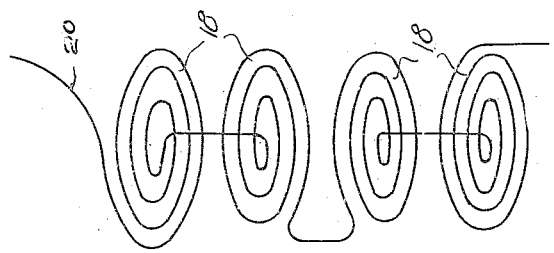

April 21, 1931. D. J. UHLE ET AL 1,801,467
APPARATUS FOR HEATING CEMENT RAW MATERIAL
Filed Feb. 2, 1929 2 Sheets-Sheet 1
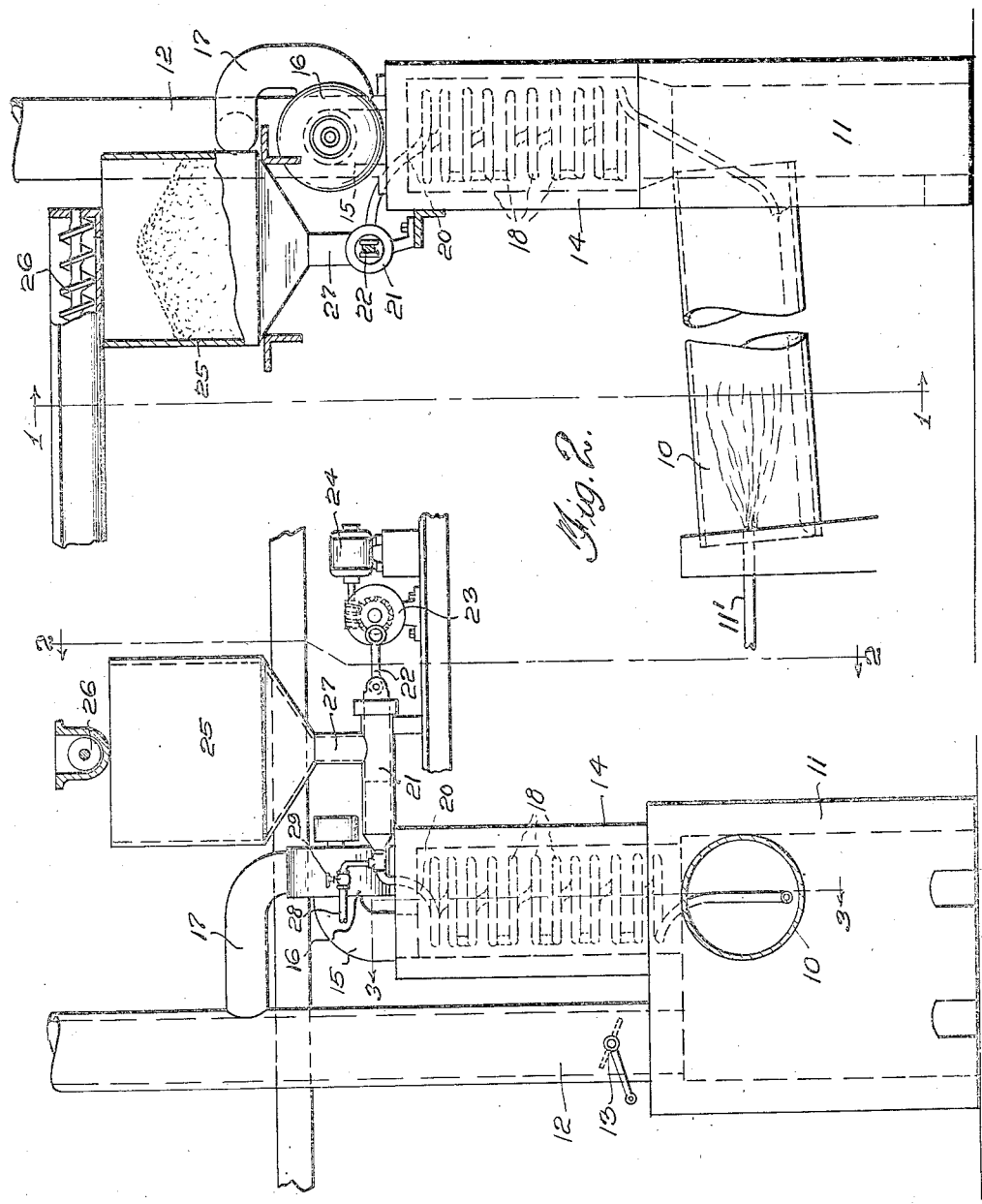
INVENTORS
DAVID J. UHLE,
MAX E. GRUNEWALD,
BY B. P. Fishburne
ATTORNEY.

April 21, 1931. D. J. UHLE ET AL 1,801,467
APPARATUS FOR HEATING CEMENT RAW MATERIAL
Filed Feb. 2, 1929 2 Sheets-Sheet 2

INVENTORS
DAVID J. UHLE.
MAX E. GRUNEWALD.
BY
ATTORNEY.

Patented Apr. 21, 1931.

1,801,467

UNITED STATES PATENT OFFICE

DAVID J. UHLE AND MAX E. GRUNEWALD, OF ALLENTOWN, PENNSYLVANIA

APPARATUS FOR HEATING CEMENT RAW MATERIAL

Application filed February 2, 1929. Serial No. 337,153.

Our invention relates to a method of and apparatus for preheating finely divided or powdered solid material, and feeding the same to a rotary kiln.

By the practice of our method, economy is effected in the use of the fuel, since the heat contained in the waste gases from the rotary kiln is utilized to preheat the powdered solid material. Further, the step of preheating the powdered solid material in the rotary kiln is dispensed with, whereby the entire length of the rotary kiln may be utilized for completing the process.

In accordance with our invention, the heated waste gases from the outlet end of a rotary kiln are passed in proximity to and exteriorly of a preheating tube, which is preferably formed in spiral units. This preheating tube is formed of a suitable heat resisting metal or metals. The dry powdered solid material, such as dry powdered cement raw material, when Portland cement is being produced, is fed into the intake end of the preheating tube, in such a manner that the intake end of the tube is closed or sealed against back pressure. The outlet end of the preheating tube is open and discharges into the rear end of the rotary kiln.

The powdered solid material, such as powdered or finely divided cement raw material has voids between its minute particles, which voids are filled with air. At atmospheric temperature, the powdered cement raw material will not readily flow without the proper addition of air thereto.

At atmospheric temperature, it would be impossible to properly force the powdered cement raw material through the preheating tube, without injecting air into the same, as it would pack within the tube.

When this dry powdered cement raw material is heated to a sufficiently high temperature, it flows freely and is converted into a form having the characteristics of a liquid. When the powdered cement raw material is thus preheated, we have found that the same will readily pass through the preheating tube without injecting air into the same. The temperature at which the material is to be preheated, varies widely, depending upon the chemical and physical characteristics of the material. Satisfactory results can be obtained by heating some cement raw material to a temperature of from 500° F. to 2500° F.

The powdered cement raw material is preheated within the preheating tube, while the intake end of the tube is sealed or closed, and its outlet end is open, as explained. The expansion of the heated air within the material, while thus confined within the preheating tube, propels, or aids in propelling the material through the tube.

The powdered cement raw material is, therefore, preheated and converted into a form having the characteristics of a fluid, by the heat contained within the waste gases from the rotary kiln, and the travel of the flowing material is effected in part or whole by the expanded heated air contained within the voids of the material. While the temperature at which the material is preheated may be widely varied, it is desired to preheat the same to as high a temperature as convenient, without impairing its flowing properties, thereby utilizing as much as possible, of the heat contained in the waste gases, for preheating the material, prior to its entrance into the kiln.

Figure 4:
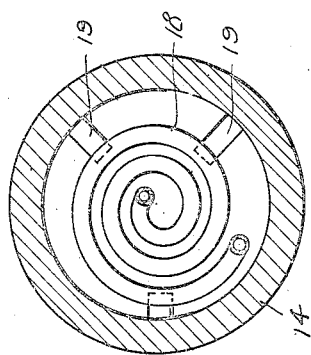
Figure 5:
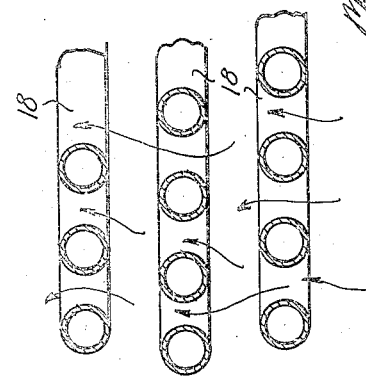
Figure 3:
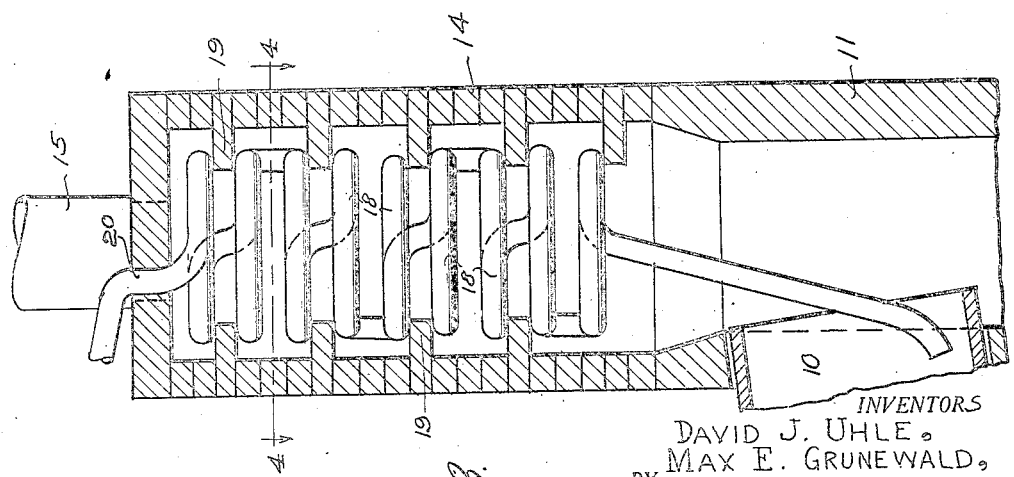

In the accompanying drawings, forming a part of this specification, and in which like numerals are employed to designate like parts throughout the same, Figure 1 is a vertical section taken on line 1—1 of Figure 2, Figure 2 is a vertical section taken on line 2—2 of Figure 1, Figure 3 is a vertical section taken on line 3—3 of Figure 1, Figure 4 is a horizontal section taken on line 4—4 of Figure 3, Figure 5 is a fragmentary vertical section taken through a plurality of the coiled units, Figure 6 is a perspective view of the preheating coil element.

In the drawings, wherein for the purpose of illustration, is shown a preferred embodiment of our invention, the numeral 10 designates a rotary kiln, the upper end of which leads into a hollow stack base or flue chamber 11. A powdered coal burner 11' is arranged at the front end of the rotary kiln, as is customary. The numeral 12 designates the stack, supported by the stack base 11. This stack is preferably provided near its lower end with an adjustable damper 13, as shown.

Means are provided for preheating the powdered cement raw material, by the heat contained within the waste gases discharging from the rotary kiln. This means comprises a hood or jacket 14, preferably formed of fire brick or the like, and preferably arranged upon the stack base 11. The lower end of this hood or jacket is open and is in free communication with the interior of the stack base 11. The top of the hood is closed and is provided with an outlet pipe 15, discharging into the intake end of a rotary blower 16, the outlet end of which discharges into a pipe 17, discharging into the stack 12. The rotary blower 16 may be dispensed with, and when this is done, the bottom of the hood 14 would be provided with a damper, to partly or completely close the same, when it is desired to cause the heated gases from the rotary kiln to pass directly into the stack 12. When the rotary blower is employed, it is not necessary to equip the hood 14 with a damper, as the rotary blower will serve as such.

Mounted within the hood or jacket 14, is a preheating elongated tube, preferably embodying a plurality of flat coils 18, which are arranged in spaced superposed relation, and supported by bricks 19, projecting between certain of the flat coils. The tube is continuous and the flat coils 18 are preferably formed or bent, so that pairs of the coils are connected at their inner ends and pairs of the same are connected at their outer ends. This is the preferred construction, while the invention is in no sense restricted to this precise arrangement. Further, the turns in the several flat coils are staggered or out of alignment, providing tortuous passages for the ascending heated gases. This enables the heated gases to have the maximum contact with the coils of the preheating tube. By the use of the term "elongated tube", we do not wish to limit ourselves to a tube of any specific length, but contemplate such a length as will be necessary to properly preheat the material and to convert the same into a form having the characteristics of a fluid. The upper end 20 of the preheating tube is connected with a pump 21, which may be of the reciprocatory type. This pump is driven by a link 22, driven by a disc 23, in turn driven by a variable speed motor 24. The invention is in no sense restricted to the use of a reciprocatory pump, as satisfactory results are obtainable by using a rotary pump of any type, such as a rotary pump embodying a spiral feeding element or a centrifugal rotary pump.

The numeral 25 designates a hopper for receiving the powdered cement raw material from a screw conveyor 26. This hopper discharges into a pipe 27, which leads to the pump 21. The pump 21 serves to positively force or feed the powdered material into the preheating tube, and also forms a seal for closing the intake end of the preheating tube, against back pressure.

Connected with the upper end of the preheating tube is a compressed air supply pipe 28, equipped with a cut-off valve 29.

We also contemplate constructing the apparatus with two or more preheating coils or units, depending upon the desired capacity of the apparatus.

In the use of the apparatus, for the practice of the method, the heated waste gases from the rotary kiln 10 discharge upwardly through the hood 14, and may be aided in their travel through the hood by the rotary blower 16. The damper 13 in the stack 12 is now partly or wholly closed. The powdered cement raw material contained within the hopper 25 is fed into the pump 21, and is forced by this pump into the upper end of the preheating tube. This upper end of the preheating tube extends exteriorly of the hood 14 and is relatively cool. The powdered solid material is somewhat compressed in this upper end and produces a seal against back pressure, and must be positively forced by the pump into the tube a sufficient distance, until the same is acted upon by the heat and converted into a form having the characteristics of a liquid, at which time it flows freely. This powdered raw material, upon passing sufficiently into the preheating tube is sufficiently heated therein so that it is converted into a form having the characteristics of a liquid and will readily flow, as above stated. The air contained within the voids of the heated powdered material expands, producing pressure, which propels or feeds, or aids in propelling or feeding the flowing material through the preheating tube, such flowing material finally discharging into the rear end of the rotary kiln.

The pump 21 may be driven at a selected speed, by the variable speed motor, and the pump will feed a regulated amount of the powdered raw cement material to the preheating tube, whereby a regulated amount of the preheated flowing material will be supplied to the rear end of the rotary kiln. This is important as it is necessary to properly regulate the amount of cement material supplied to the rotary kiln.

The dry preheated flowing cement raw material discharges into the rotary kiln 10, where the calcination and clinkering are completed in the usual manner, by the heat developed through combustion at the burner. The preheating tube performs the work of preheating the powdered cement raw material, which is ordinarily performed in the rotary kiln, and the preheating is effected by the heat in the waste gases discharging from the rotary kiln. It is believed that little, if any, calcination or other chemical reactions ordinarily occurs in the preheating tube. However, the method may be so practiced that the major portion, or all of the calcination or other chemical reactions, may occur in the preheating tube. The partial or complete calcination in the preheating tube will not impair the fluid properties of the heated materials, and the gases liberated will produce increased pressure, to further aid in the propelling or travel of the heated flowing material.

Should the pump 21 become inoperative or stop, it would be necessary to cool the preheating tube, and this is accomplished by opening the valve 29, whereby compressed air from the pipe 28, at atmospheric temperature, is forced through the preheating tube, thus cooling the same, and preventing the same from being damaged due to the action of the heat.

While the method has been described, for the sake of illustration, in the treatment of cement raw material, to produce Portland cement, it is not restricted to this purpose. It may be practiced in the treatment of any raw material, which is fed to a rotary kiln in a dry powdered form, for heat treatment in the rotary kiln.

Having thus described our invention, we claim:—

1. In apparatus for preheating powdered solid cement raw material or the like and feeding the same to a rotary kiln, the combination with a rotary kiln, of a hood in communication with the same to receive the heated waste gases from the rotary kiln, an elongated preheating tube arranged within the hood and having its outlet end discharging the material into the rotary kiln, a pump to force the powdered solid material into the tube and forming a seal, and means to feed the powdered solid material to the pump.

2. In apparatus for preheating powdered solid cement raw material or the like and feeding the same to a rotary kiln, the combination with a rotary kiln, of an elongated preheating tube arranged to discharge the material into the rotary kiln, means for receiving heated waste gases from the rotary kiln and pass the same exteriorly of and in contact with the preheating tube, and means for introducing the powdered solid material into the tube and forming a seal with the tube.

3. In apparatus for preheating powdered solid cement raw material or the like and feeding the same to a rotary kiln, the combination with a rotary kiln, of an elongated preheating tube having its discharge end open and arranged to feed the powdered solid material into the rotary kiln, means for receiving heated waste gases from the rotary kiln and passing the same exteriorly of and in contact with the preheating tube, and means for introducing the solid powdered material into the intake end of the preheating tube and sealing such intake end.

4. In apparatus for preheating powdered solid cement raw material or the like and feeding the same to a rotary kiln, the combination with a rotary kiln, of an elongated preheating tube having its discharge end open and arranged to feed the powdered solid material into the rotary kiln, means for receiving heated waste gases from the rotary kiln and passing the same exteriorly of and in contact with the preheating tube, means for introducing the solid powdered material into the intake end of the preheating tube and sealing such intake end, and separate means for introducing a cooling gas into the preheating tube when the feeding means is inactive.

5. In apparatus for preheating powdered solid cement raw material or the like and feeding the same to a rotary kiln, the combination with a rotary kiln, of a chamber receiving the heated waste gases from the rotary kiln, an elongated preheating tube arranged within the chamber and having its outlet end discharging the material into the rotary kiln, the heated gases within the chamber passing exteriorly of and in contact with said tube, said tube being coiled, and means for feeding the powdered solid material to the intake end of the tube and sealing such intake end.

6. In apparatus for preheating powdered solid cement raw material or the like and feeding the same to a rotary kiln, the combination with a rotary kiln, of a chamber receiving the heated waste gases from the rotary kiln, an elongated preheating tube arranged within the chamber and having its outlet end discharging the material into the rotary kiln, the heated gases within the chamber passing exteriorly of and in contact with said tube, said tube embodying a plurality of spaced superposed generally flat coils, the turns in the several coils being staggered so that the heated gases are caused to travel in a tortuous path about said coils, and means for feeding powdered solid material to the intake end of the tube and also providing a seal.

7. In apparatus for preheating solid cement raw material or the like and feeding the same to a rotary kiln, a rotary kiln, a stack base in communication with the rotary kiln, a stack mounted upon a stack base, a hood mounted upon the stack base to receive the heated gases from the stack base, an elongated preheating tube arranged within the hood so that the heated gases therein pass exteriorly of and in contact with the same, said tube having its outlet end discharging the material into the rotary kiln, means for feeding powdered solid material into the tube and also providing a seal, means of communication between the outlet end of the hood and the stack, and means for controlling the passage of the waste gases through the stack.

8. In apparatus for preheating powdered solid cement raw material or the like and feeding the same to a rotary kiln, a rotary kiln, a stack base in communication with the rotary kiln, a stack mounted upon the stack base, a damper for the stack, a hood mounted upon the stack base to receive the heated gases from the same, a pipe connecting the hood and stack, a rotary blower connected in the pipe, an elongated preheating tube arranged within the hood so that the heated gases therein pass exteriorly of and in contact with the same, said tube having its outlet end discharging the material into the rotary kiln, and means for feeding powdered solid material into the tube and also providing a seal.

9. In apparatus for preheating powdered solid cement raw material and feeding the same to a rotary kiln, comprising an elongated preheating tube having its outlet end arranged to discharge the material into the rotary kiln, means for receiving heated waste gases from the rotary kiln and passing the same exteriorly of and in contact with the preheating tube, and means for forcing a regulated amount of the powdered solid material into the preheating tube near its intake end.

10. In apparatus for preheating powdered solid cement raw material or the like and feeding the same to a rotary kiln, comprising a generally vertical elongated tubular preheating unit having its lower end open for discharging the material into the rotary kiln, means for receiving heated waste gases from the rotary kiln and passing the same exteriorly off and in contact with the tubular preheating unit, and means for forcing the powdered solid material into the upper end of the tubular preheating unit and regulating the amount of such material and also producing a seal.

11. In apparatus for preheating powdered solid cement raw material or the like and feeding the same to a rotary kiln, the combination of a rotary kiln, an elongated preheating tube having its discharge end open and arranged to feed the powdered solid material into the rotary kiln, means for receiving heated waste gases from the rotary kiln and passing the same exteriorly of and in contact with the preheating tube, means for introducing the solid powdered material into the intake end of the preheating tube and forming a seal, and means for introducing a gas into the preheating tube near its intake end.

12. In apparatus for preheating powdered solid cement raw material or the like and feeding the same to a rotary kiln, the combination with a rotary kiln, of a chamber receiving the heated waste gases from the rotary kiln, an elongated preheating tube arranged within the chamber and having its outlet end discharging the material into the rotary kiln, the heated gases within the chamber passing exteriorly of and in contact with said tube, means connected with the inlet end of the preheating tube and adapted to receive the powdered solid material and subject the same to the action of pressure to feed the same into the intake end of the preheating tube and also providing a seal, and means for supplying a gas to the preheating tube.

13. In apparatus for preheating solid cement raw material or the like, and feeding the same to a rotary kiln, the combination with a rotary kiln, of a hood receiving the heated waste gases from the rotary kiln, a blower mechanism for drawing the heated gases through the hood, an elongated tubular preheating unit arranged within the hood in the path of travel of the heated gases so that its exterior contacts therewith, said tubular heating unit discharging the material into the rotary kiln, and means for feeding the solid material into the tubular preheating unit and forming a seal.

In testimony whereof we affix our signatures.

DAVID J. UHLE.
MAX E. GRUNEWALD.